(12) United States Patent
Hall et al.

(10) Patent No.: US 11,267,445 B2
(45) Date of Patent: Mar. 8, 2022

(54) CAR CONTROL DEVICE WAKE UP FOR ELECTRICALLY CONTROLLED PNEUMATIC TRAIN BRAKING SYSTEMS

(71) Applicant: NEW YORK AIR BRAKE, LLC, Watertown, NY (US)

(72) Inventors: Evan Hall, Evans Mills, NY (US); David Socha, Watertown, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 218 days.

(21) Appl. No.: 16/381,566

(22) Filed: Apr. 11, 2019

(65) Prior Publication Data
US 2020/0324746 A1 Oct. 15, 2020

(51) Int. Cl.
| | | |
|---|---|---|
| B60T 8/17 | (2006.01) |
| B60T 13/66 | (2006.01) |
| B61H 13/34 | (2006.01) |
| H02J 7/00 | (2006.01) |
| H02J 7/34 | (2006.01) |
| B60T 15/02 | (2006.01) |

(52) U.S. Cl.
CPC .......... B60T 8/1705 (2013.01); B60T 13/662 (2013.01); B61H 13/34 (2013.01); H02J 7/0063 (2013.01); B60T 15/025 (2013.01); H02J 7/345 (2013.01)

(58) Field of Classification Search
CPC .... B60T 8/1705; B60T 13/662; B60T 15/025; B61H 13/34; H02J 7/0063; H02J 7/345
See application file for complete search history.

(56) References Cited

U.S. PATENT DOCUMENTS 4,005,837 A * 2/1977 Grundy ............... B61L 3/008
246/182 B
5,385,392 A * 1/1995 Ferri ................... B60T 13/665
303/15
5,722,736 A * 3/1998 Cook .................. B60T 13/665
303/15

(Continued)

FOREIGN PATENT DOCUMENTS

CN 104619566 A * 5/2015 ............ B60W 10/08
CN 204547804 U * 8/2015
(Continued)

*Primary Examiner* — Hunter B Lonsberry
*Assistant Examiner* — Jay Khandpur
(74) *Attorney, Agent, or Firm* — Bond Schoeneck and King PLLC; David Nocilly

(57) ABSTRACT

A system for waking up a dormant car control device of rail car braking system that provides a sufficient wake up voltage in response to pressurization of the brake pipe of the transit car. A supercapacitor is used to output a predetermined voltage when a pressure switch responsive to a source of brake pipe pressure moves to a closed position in response to a charging of the brake system. A first circuit boosts the predetermined voltage of the supercapacitor and energized the contacts of a relay that can selectively provide the boosted voltage to an input of a car control device. A second circuit controls the relay to select when boosted voltage should be provided to the input of a car control device. A third circuit selectively provides power to the first and second circuits based on whether the car control device should receive the boosted voltage.

14 Claims, 2 Drawing Sheets

(56) References Cited

U.S. PATENT DOCUMENTS

Figure 1:
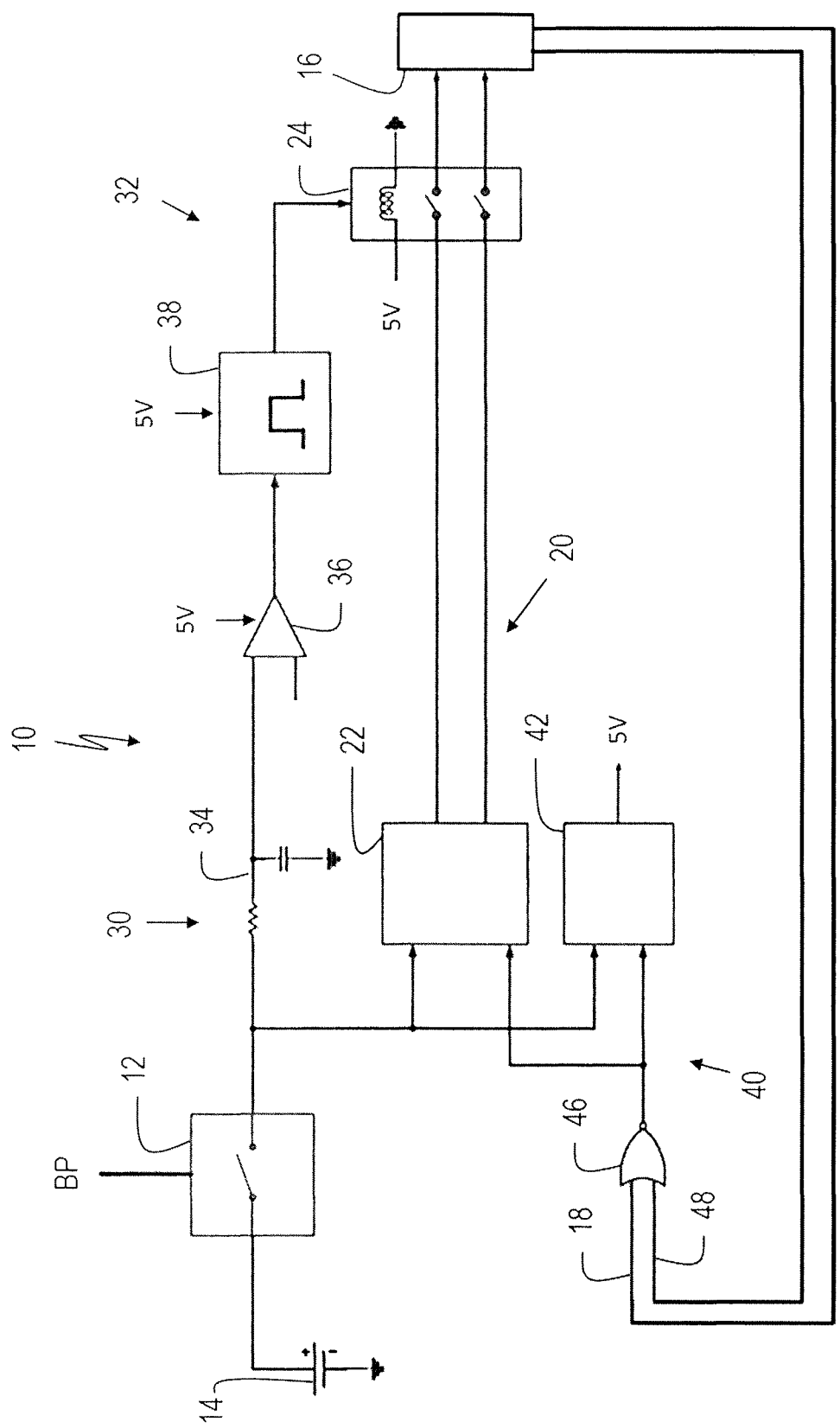

| | | | | | |
|---|---|---|---|---|---|
| 5,777,547 | A | * | 7/1998 | Waldrop | B61L 25/028 340/438 |
| 6,175,784 | B1 | * | 1/2001 | Jicha | B61L 3/125 188/107 |
| 6,466,519 | B1 | * | 10/2002 | Nakamura | G04C 10/00 368/204 |
| 6,979,061 | B1 | * | 12/2005 | Lumbis | B60T 13/683 303/7 |
| 2015/0015060 | A1 | * | 1/2015 | Tippey | B60T 13/665 303/8 |
| 2017/0313331 | A1 | * | 11/2017 | Hilleary | B61L 17/02 |
| 2019/0299944 | A1 | * | 10/2019 | Nilsson | B60W 20/14 |
| 2019/0344764 | A1 | * | 11/2019 | Kernwein | B60T 17/228 |

FOREIGN PATENT DOCUMENTS

| | | | | |
|---|---|---|---|---|
| CN | 109435927 A | * | 3/2019 | |
| WO | WO-2018005609 A1 | * | 1/2018 | B62D 35/001 |

\* cited by examiner

CAR CONTROL DEVICE WAKE UP FOR ELECTRICALLY CONTROLLED PNEUMATIC TRAIN BRAKING SYSTEMS

BACKGROUND OF THE INVENTION

1. Field of the Invention

The present invention to electrically controlled pneumatic train braking systems and, more specifically, to a system and method for waking up a car control device in the absence of voltage changes.

2. Description of the Related Art

In an electrically controlled pneumatic (ECP) passenger train, a car control device (CCD) is positioned on each transit car and is used to receive and execute braking system commands initiated at the electronic brake valve (EBV) located in the cab of the locomotive. The CCD is coupled to the pneumatic braking system of the transit car and is programmed to control the transit car braking system according to received commands. For example, the CCD can apply the pneumatic brakes of the transit car in response to an automatic brake command sent from the EBV in response to the train driver moving the automatic brake handle of the EBV.

Typically, a CCD that is in sleep mode after a predetermined time without use, such as when no input power is present and the transit car is setting in a yard, will only awaken in response to a transition in the voltage on the power input line. When a CCD is powered by the local battery of a transit car, however, there is not always a way to produce a sufficient voltage transition to end the sleep mode. As a result, there is a need in the art for an approach that can produce a sufficient voltage transition to the power input of the CCD so that it is properly awoken from a sleep mode.

BRIEF SUMMARY OF THE INVENTION

The present invention is a system that can activate a dormant car control device of an electrically controlled pneumatic braking system by applying a sufficient wake up voltage in response to pressurization of the brake pipe of the transit car. The system comprises a supercapacitor capable of outputting a predetermined voltage and a pressure switch that is responsive to a source of brake pipe pressure to move to a closed position in response to a predetermined amount of pressure. A first circuit is coupled to the supercapacitor via the pressure switch and is configured to boost the predetermined voltage of the supercapacitor. A relay is coupled to the first circuit to selectively provide the boosted voltage to an input of a car control device. A second circuit is coupled to the supercapacitor and the relay and is configured to control the relay to select when boosted voltage is provided to the input of a car control device. A third circuit is coupled to the supercapacitor via the pressure switch and is configured to selectively provide power to the first circuit and the second circuit based on whether the car control device should receive the boosted voltage. The second circuit may comprise a delay configured to provide time for the first circuit to be fully energized prior to the second circuit being fully energized. The second circuit may further comprise a comparator coupled to the delay and configured to monitor the predetermined voltage of the supercapacitor. The second circuit further comprises a one shot timer coupled to the comparator. The third circuit may comprise a power circuit configured to provide power to the first circuit and a second circuit and a feedback circuit that can enable or disable the power circuit based on an input from the car control device. The feedback circuit may be configured to be powered by an input from the car control device. The input from the car control device may comprise a signal that the car control device is awake. The input from the car control device may comprise a signal that the car control device is in a fault condition.

In another embodiment, the present invention comprises a method of waking up a car control device of an electrically controlled pneumatic braking system. The method comprises providing a pressure switch configured to close in response to a threshold amount of brake pipe pressure. The method also comprises coupling a supercapacitor capable of outputting a predetermined voltage to a first circuit via closing of the pressure switch, wherein the first circuit is configured to boost the predetermined voltage of the supercapacitor and provide the boosted voltage to a relay. The method further comprises coupling the supercapacitor to a second circuit via closing of the pressure switch, wherein the second circuit is configured to control the relay to select when the boosted voltage is provided to an input of the car control device. The method additional comprises coupling a supercapacitor to a third circuit via closing of the pressure switch, wherein the third circuit is configured to selectively provide power to the first circuit and the second circuit based on whether the car control device should receive the boosted voltage. The method also comprises checking whether the car control device needs to be woken up and, if so, controlling the relay with the second circuit to provide the boosted voltage of the first circuit to the input of the car control device. The method may further checking to determine whether the car control device should not be woken up and, if so, using the third circuit to remove power from the first circuit and the second circuit.

BRIEF DESCRIPTION OF THE SEVERAL VIEWS OF THE DRAWING(S)

Figure 2:
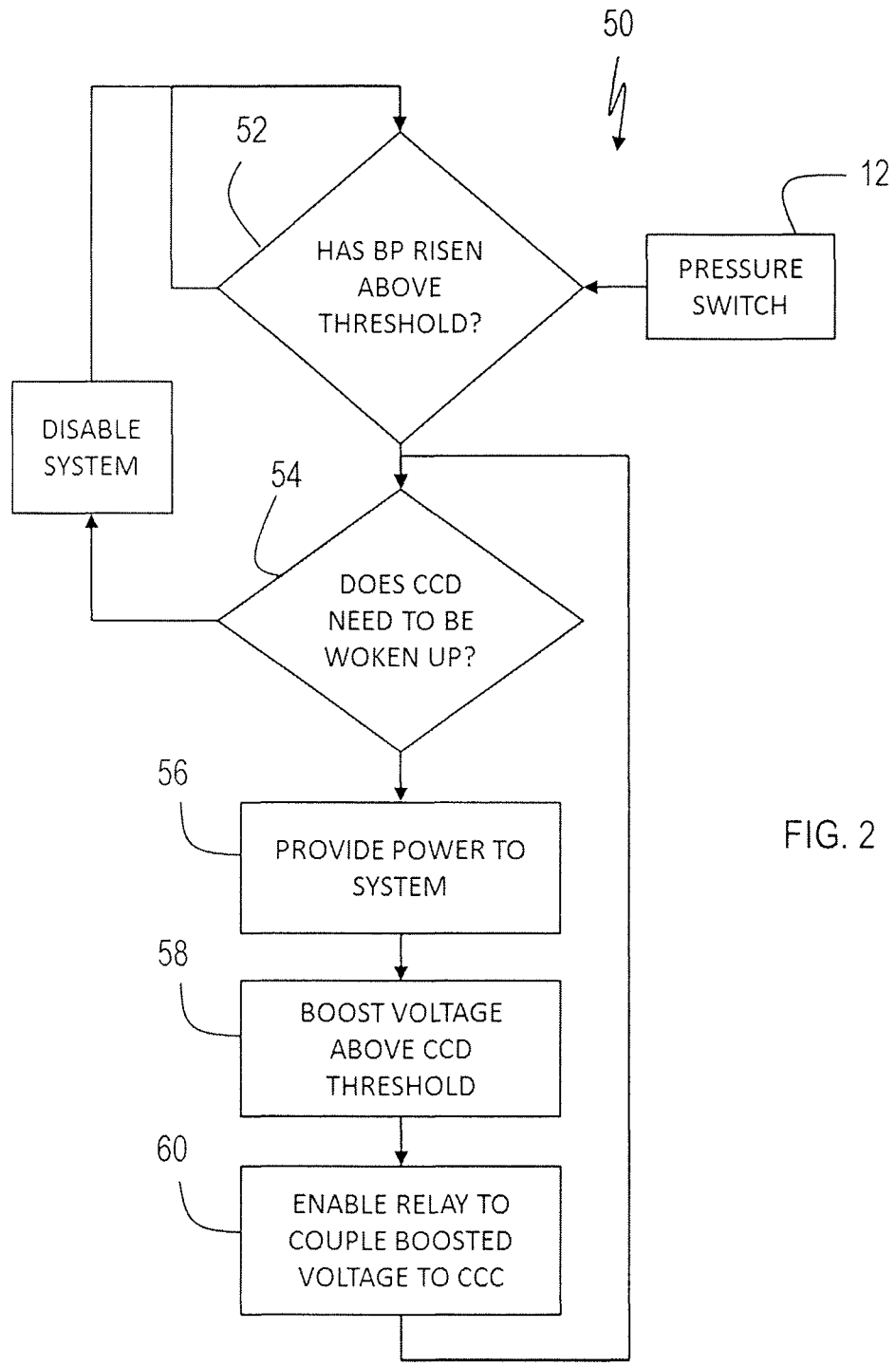

The present invention will be more fully understood and appreciated by reading the following Detailed Description in conjunction with the accompanying drawings, in which:

FIG. 1 is a schematic of a system for waking up a car control device according to the present invention; and FIG. 2 is a flowchart of a method for waking up a car control device according to the present invention.

DETAILED DESCRIPTION OF THE INVENTION

Referring to the figures, wherein like numerals refer to like parts throughout, there is seen in FIG. 1 a wake up system 10 for activating a car control device (CCD) of a transit car that is in sleep mode. Wake up system 10 includes a pressure switch 12 that is biased into the open position and will close against the bias in response to a predetermined amount of pressure in the train brake pipe BP. The predetermined amount of pressure may be selected to be an amount indicating that transit car is to be used. For example, if the normal operating brake pipe pressure was 110 psi, the predetermined amount can be selected to be an amount of pressure that is above 60 or 80 psi, thereby indicating the likelihood that the transit car is being pressurized to be put into service. Switch 12 is coupled to a supercapacitor 14, i.e., a capacitor that has a sufficient capacitance value to produce a voltage transition that will be detected as a wake up even by a CCD 16. For example, a 25 farad (F) module that can provide at least 0.33 F may be used, as that will be able to provide a sufficient voltage transition to wake up conventional CCDs 16 for up to seven days of non-use.

Closing of switch 12 in response to the development of pressure in brake pipe BP will simultaneously couple supercapacitor 14 to three stages. The first stage 20 of system 10 comprises a voltage boost circuit 22 that boosts the voltage received from supercapacitor 14 sufficiently so that the voltage is above the input threshold of CCD 16, i.e., a voltage that would be recognized by CCD 16 as a voltage transition indicating a wake up event. For example, CCD 16 may be configured to wake up in response to a voltage input that is greater than 100V DC. It should be recognized that CCD 16 may be configured to response to different voltage inputs by the particular manufacturer or in response to different customer requirements, and thus voltage boost circuit 22 of first stage 20 could be correspondingly configured to provide at least that particular voltage to CCD 16. Voltage boost circuit 22 is coupled to the contacts of a relay 24 that may be selectively opened and closed to couple and decouple voltage boost circuit 22 to CCD 16. The function of relay 24 may be performed by any acceptable switching component, such as a metal-oxide semiconductor field-effect transistor (MOSFET), insulated-gate bipolar transistor (IGBT), or solid state relay.

The second stage 30 of system 10 comprises a relay enablement circuit 32 that controls the opening and closing of relay 24. Second stage 30 includes a delay 34, a comparator 36, and a one-shot timer 38 in series. Delay 34 is used to provide first stage 20 with sufficient time to load and boost voltage from supercapacitor 14. Delay 34 could be performed with an active circuit, such as a power-on resist device. Comparator 36 is used to check for feedback from CCD 16 that indicates a fault has occurred and, if so, disconnect supercapacitor 14 by disabling relay 24 so that supercapacitor 14 does not continue to discharge and become fully drained unnecessarily. One-shot timer 38 ultimately provides an enable signal for relay 24 so that relay 24 closes to couple contacts energized by voltage boost circuit 22 with the power input of CCD 16.

The third stage 40 of system 10 comprises a wake-up circuit power circuit 42 that provides local power (illustrated as 5 volts) to relay 24, delay 34, comparator 36, and one-shot timer 38. Third stage 40 further includes a feedback circuit 46 that receives power 18 from CCD 16 and is also coupled via a signal line 48 to receive a signal from CCD 16 indicating that CCD 16 is awake. Thus, when wake up system 10 is not required to function, feedback circuit 46 controls wake-up circuit power circuit 42 to disable first stage 20 so that relay 24 is disabled and to disable second stage 30 so that there is no load on supercapacitor 14.

Referring to FIG. 2, wake up system 10 employs a method 50 that begins with a check to determine if there is a threshold amount of brake pipe pressure in step 52 as detected by pressure switch 12. If so, a check in step 54 is performed by third stage 40 to determine whether CCD should be woken up. If not, third stage 40 disables system 10 by removing local power. If so, third stage 40 provides power in step 56 to system 10. In addition, the low voltage from supercapacitor 14 is boosted in step 58 to be greater than the turn on input threshold of CCD 16 by voltage boost circuit. Next, relay 24 is enabled in step 60 by relay enablement circuit 32 to apply the boasted voltage in step 56 to the input of CCD 16. Control may then return to check in step 54 to disable system 10 if the feedback from feedback circuit 46 indicates that CCD 16 has woken up or is in a fault condition.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for activating a car control device of an electrically controlled pneumatic braking system, comprising:
    a supercapacitor capable of outputting a predetermined voltage;
    a pressure switch responsive to a source of brake pipe pressure to move to a closed position in response to a predetermined amount of pressure;
    a first circuit coupled to the supercapacitor via the pressure switch and configured to boost the predetermined voltage of the supercapacitor to a boosted voltage;
    a relay coupled to the first circuit to selectively provide the boosted voltage to a power input of the car control device;
    a second circuit coupled to the supercapacitor and the relay that is configured to control the relay to select when the boosted voltage is provided to the power input of the car control device; and
    a third circuit coupled to the supercapacitor via the pressure switch that is configured to selectively provide power to the first circuit and the second circuit based on whether the car control device is to receive the boosted voltage.

2. The system of claim 1, wherein the second circuit comprises a delay configured to provide time for the first circuit to be fully energized prior to the second circuit being fully energized.

3. The system of claim 2, wherein the second circuit further comprises a comparator coupled to the delay and configured to monitor the predetermined voltage of the supercapacitor.

4. The system of claim 3, wherein the second circuit further comprising a one shot timer coupled to the comparator.

5. The system of claim 4, wherein the third circuit comprises a power circuit configured to provide power to the first circuit and to the second circuit, and a feedback circuit that can enable or disable the power circuit based on a feedback output from the car control device.

6. The system of claim 5, wherein the feedback output is configured to be powered by a power output from the car control device.

7. The system of claim 6, wherein the feedback output from the car control device comprises a signal that the car control device is awake.

8. The system of claim 7, wherein the feedback input from the car control device comprises a signal that the car control device is in a fault condition.

9. A method of waking up a car control device of an electrically controlled pneumatic braking system, comprising the steps of:
providing a pressure switch configured to close in response a threshold amount of brake pipe pressure;
coupling a supercapacitor capable of outputting a predetermined voltage to a first circuit via closing of the pressure switch, wherein the first circuit is configured to boost the predetermined voltage of the supercapacitor to a boosted voltage and to provide the boosted voltage to a relay;
coupling the supercapacitor to a second circuit via closing of the pressure switch, wherein the second circuit is configured to control the relay to select when the boosted voltage is provide to a power input of the car control device;
coupling the supercapacitor to a third circuit via closing of the pressure switch, wherein the third circuit is configured to selectively provide power to the first circuit and the second circuit based on whether the car control device is to receive the boosted voltage; and
checking whether the car control device is to be woken up and, if so, controlling the relay with the second circuit to provide the boosted voltage of the first circuit to the power input of the car control device.

10. The method of claim 9, further comprising the step of checking to determine whether the car control device is not be woken up and, if so, using the third circuit to remove power from the first circuit and the second circuit.

11. The method of claim 10, wherein the second circuit comprises a delay configured to provide time for the first circuit to be fully energized prior to the second circuit being fully energized, a comparator coupled to the delay and configured to monitor the predetermined voltage of the supercapacitor, and a one shot timer coupled to the comparator.

12. The method of claim 11, wherein the third circuit comprises a power circuit configured to provide power to the first circuit and to the second circuit, and a feedback circuit that can enable or disable the power circuit based on a feedback output from the car control device.

13. The method of claim 12, wherein the feedback circuit is configured to be powered by a power output from the car control device.

14. The method of claim 13, wherein the feedback output from the car control device comprises a signal indicating that the car control device is awake or indicating that the car control device is in a fault condition.

* * * * *